United States Patent
Ping et al.

(10) Patent No.: US 11,438,210 B2
(45) Date of Patent: Sep. 6, 2022

(54) APPARATUS AND METHOD FOR HANDLING MANAGED OBJECT PRIORITIES IN 5G NETWORK

(71) Applicant: NOKIA SOLUTIONS AND NETWORKS OY, Espoo (FI)

(72) Inventors: Jing Ping, Sichuan (CN); Anatoly Andrianov, Schaumburg, IL (US); Olaf Pollakowski, Berlin (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/269,796

(22) PCT Filed: Aug. 24, 2018

(86) PCT No.: PCT/CN2018/102359
§ 371 (c)(1),
(2) Date: Feb. 19, 2021

(87) PCT Pub. No.: WO2020/037689
PCT Pub. Date: Feb. 27, 2020

(65) Prior Publication Data
US 2021/0243067 A1    Aug. 5, 2021

(51) Int. Cl.
*H04L 41/0233* (2022.01)
*H04W 28/16* (2009.01)
*H04W 72/10* (2009.01)

(52) U.S. Cl.
CPC ......... *H04L 41/0233* (2013.01); *H04W 28/16* (2013.01); *H04W 72/10* (2013.01)

(58) Field of Classification Search
CPC .... H04L 41/0233; H04W 28/16; H04W 72/10
USPC ......................................................... 709/223
See application file for complete search history.

(56) References Cited

U.S. PATENT DOCUMENTS

| | | | |
|---|---|---|---|
| 10,667,278 B2* | 5/2020 | Chen | H04W 88/08 |
| 11,272,538 B2* | 3/2022 | Zhao | H04L 5/0055 |
| 2018/0014222 A1 | 1/2018 | Song et al. | |
| 2018/0184463 A1* | 6/2018 | Fakoorian | H04W 74/0875 |
| 2018/0295639 A1* | 10/2018 | Bhushan | H04J 3/1694 |
| 2018/0309632 A1* | 10/2018 | Kompella | H04L 41/0853 |
| 2019/0037577 A1* | 1/2019 | Sun | H04L 41/0866 |
| 2019/0068317 A1* | 2/2019 | Babaei | H04W 72/0446 |
| 2019/0132236 A1* | 5/2019 | Rahman | H04L 45/74 |

(Continued)

OTHER PUBLICATIONS

Extended European Search Report dated Feb. 23, 2022 corresponding to European Patent Application No. 18930853.9.

(Continued)

*Primary Examiner* — Melvin H Pollack
(74) *Attorney, Agent, or Firm* — Squire Patton Boggs (US) LLP (57) ABSTRACT

Systems, methods, apparatuses, and computer program products for handling managed object priorities in a network, such as 5G, are provided. One method includes receiving a constraint on a priority of a managed object, assigning a priority value satisfying the received constraint to an instance of the managed object, identifying a supporting resource for the managed object with the assigned priority value, and assigning a priority for the supporting resource, using the assigned priority value as a constraint.

20 Claims, 6 Drawing Sheets

(56) References Cited

U.S. PATENT DOCUMENTS

| | | | | |
|---|---|---|---|---|
| 2019/0200370 A1* | 6/2019 | Yang | ................... | H04L 5/0053 |
| 2019/0268916 A1* | 8/2019 | Guo | ................... | G06F 16/252 |
| 2019/0349426 A1* | 11/2019 | Smith | ................... | H04W 4/08 |
| 2019/0357118 A1* | 11/2019 | Kim | ................. | H04W 28/0289 |
| 2019/0387377 A1* | 12/2019 | Zhang | ............... | H04W 52/383 |
| 2020/0068593 A1* | 2/2020 | Seo | ................... | H04W 72/1247 |
| 2020/0137776 A1* | 4/2020 | Lee | ...................... | H04L 5/0044 |
| 2020/0170062 A1* | 5/2020 | Yang | ................... | H04W 88/06 |
| 2021/0194730 A1* | 6/2021 | Kim | .................. | H04L 12/4641 |

OTHER PUBLICATIONS

"Network Functions Virtualisation (NFV) Release 3; Evolution and Ecosystem; Report on Network Slicing Support with ETSI NFV Architecture Framework," ETSI Draft; ETSI GR NFV-EVE 012, European Telecommunications Standards Institute (ETSI), vol. ISG-NFV, No. V3.1.1, Dec. 21, 2017, pp. 1-35, XP014320233.

China Telecom et al., "Discussion on network slice priority," 3GPP Draft; S5-185254, 3GPP TSG SA WG5 (Telecom Management) Meeting #120, Aug. 20-24, 2018, Belgrade, Serbia, Aug. 10, 2018, XP051543099.

Menglan Jiang et al., "Network slicing management & prioritization in 5G mobile systems," European Wireless 2016, May 22, 2016, pp. 197-202, XP055395285.

International Search Report and Written Opinion dated Mar. 27, 2019 corresponding to International Patent Application No. PCT/CN2018/102359.

Huawei, "Add use case and requirement for network slice instance priority," 3GPP S5-171681, 3GPP TSG SA WG5 (Telecom Management) Meeting #112, Mar. 31, 2017.

China Telecom et al., "pCR TS 28541 adding network slice priority in class definitions," 3GPP S5-185266, 3GPP TSG SA WG5 (Telecom Management) Meeting #120, Aug. 13, 2018.

China Telecom et al., "Discussion on network slice priority," 3GPP S5-185428, 3GPP TSG SA WG5 (Telecom Management) Meeting #120, Aug. 22, 2018.

China Telecom et al., "Architectural Assumptions and Requirement," 3GPP S2-186275, SA WG2 Meeting #S2-127-bis, Jun. 1, 2018.

China Telecom et al., "pCR TS 28531 adding network slice priority in procedure of NSI allocation," 3GPP S5-185263, 3GPP TSG SA WG5 (Telecom Management) Meeting #120, Aug. 13, 2018.

\* cited by examiner

APPARATUS AND METHOD FOR HANDLING MANAGED OBJECT PRIORITIES IN 5G NETWORK

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to the handling of managed object priorities in such networks.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in E-UTRAN or eNB in LTE) may be named gNB when built on NR radio and may be named NG-eNB when built on E-UTRA radio.

SUMMARY

One embodiment is directed to a method. The method may include receiving a constraint on a priority of a managed object. The method may also include assigning a priority value satisfying the received constraint to an instance of the managed object. The method may further include identifying a supporting resource for the managed object with the assigned priority value; and assigning a priority for the supporting resource, using the assigned priority value as a constraint.

In certain embodiments, the method may further include identifying dependent managed objects of the managed object based on an object containment relationship in an object structure including the managed object; and assigning priority values to instances of the identified dependent managed objects using the assigned priority value as a constraint.

In certain embodiments, assigning the priority value may include calculating the priority value for the managed object.

In certain embodiments, assigning the priority value may include: receiving the priority for the managed object from a management function which manages the managed object.

In certain embodiments, the method further may include monitoring the supporting resource using the priority value of the managed object as a constraint.

In certain embodiments, the managed object may include one or more of a 3GPP Managed Function, a 3GPP Managed Element, a 3GPP Sub Network, a 3GPP Network Slice, a 3GPP Network Slice Subnet, an ETSI NFV NS, an ETSI NFV VNF, an ETSI NFV VNFC, and/or an ETSI NFV VR.

In some embodiments, the method may include deriving or calculating the priority value according to the process/algorithm discussed herein.

According to certain embodiments, when the managed object may include a root managed object, assigning the priority value may include deriving the priority value based on at least one of a service level agreement, communication service type, and customer type.

According to certain embodiments, when the managed object may include a child managed object, assigning the priority value may include: deriving the priority value based on at least one of a priority of one or more parent managed objects, a priority of one or more child managed objects, a weight of the priority of the one or more child managed objects, a weight of the priority of the one or more parent managed objects, the number of the one or more child managed objects, and the number of the one or more parent managed objects.

According to certain embodiments, the priority of the managed object is exchanged inside a management function, or between management functions of a same management domain, or between management domains.

According to certain embodiments, the assigning, identifying and assigning steps may be recursively repeated for each managed object. As such, in one embodiment, the method may include determining whether priority values have been assigned to each identified managed object and, if not, repeating the steps until each identified managed object has an assigned priority value.

Another embodiment is directed to an apparatus that may include at least one processor and at least one memory including computer program code. The at least one memory and computer program code may be configured, with the at least one processor, to cause the apparatus at least to receive a constraint on a priority of a managed object. The at least one memory and computer program code may also be configured, with the at least one processor, to cause the apparatus at least to assign a priority value satisfying the received constraint to an instance of the managed object. The at least one memory and computer program code may also be configured, with the at least one processor, to cause the apparatus at least to identify a supporting resource for the managed object with assigned priority value. The at least one memory and computer program code may also be configured, with the at least one processor, to cause the apparatus at least to assign a priority for the supporting resource using the assigned priority value as a constraint.

In certain embodiments, the at least one memory and computer program code may also be configured, with the at least one processor, to cause the apparatus at least to identify dependent managed objects of the managed object based on an object containment relationship in an object structure including the managed object; and assigning priority values to instances of the identified dependent managed objects using the assigned priority value as a constraint.

In certain embodiments, the at least one memory and computer program code may also be configured, with the at least one processor, to cause the apparatus at least to calculate the priority value for the managed object.

In certain embodiments, the at least one memory and computer program code may also be configured, with the at least one processor, to cause the apparatus at least to receive the priority for the managed object from a management function which manages the managed object.

In certain embodiments, the at least one memory and computer program code may also be configured, with the at least one processor, to cause the apparatus at least to monitor the supporting resource using the priority value of the managed object as a constraint.

In certain embodiments, the managed object may include one or more of a 3GPP Managed Function, a 3GPP Managed Element, a 3GPP Sub Network, a 3GPP Network Slice, a 3GPP Network Slice Subnet, an ETSI NFV NS, an ETSI NFV VNF, an ETSI NFV VNFC, and/or an ETSI NFV VR.

In some embodiments, the at least one memory and computer program code may also be configured, with the at least one processor, to cause the apparatus at least to derive or calculate the priority value according to the process/algorithm discussed herein.

According to certain embodiments, the at least one memory and computer program code may also be configured, with the at least one processor, to cause the apparatus at least to, when the managed object may include a root managed object, derive the priority value based on at least one of a service level agreement, communication service type, and customer type.

According to certain embodiments, the at least one memory and computer program code may also be configured, with the at least one processor, to cause the apparatus at least to, when the managed object may include a child managed object, derive the priority value based on at least one of a priority of one or more parent managed objects, a priority of one or more child managed objects, a weight of the priority of the one or more child managed objects, a weight of the priority of the one or more parent managed objects, the number of the one or more child managed objects, and the number of the one or more parent managed objects.

According to certain embodiments, the priority of the managed object is exchanged inside a management function, or between management functions of a same management domain, or between management domains.

According to certain embodiments, the assigning, identifying and assigning steps may be recursively repeated for each managed object. As such, in one embodiment, the at least one memory and computer program code may also be configured, with the at least one processor, to cause the apparatus at least to determine whether priority values have been assigned to each identified managed object and, if not, repeating the steps until each identified managed object has an assigned priority value.

A yet another embodiment is directed to an apparatus that may include receiving means for receiving a constraint on a priority of a managed object; assigning means for assigning a priority value satisfying the received constraint to an instance of the managed object; identifying means for identifying a supporting resource for the managed object with the assigned priority value; and assigning means for assigning a priority for the supporting resource, using the assigned priority value as a constraint.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for handling managed object priorities in a network, such as 5G, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

The 5G System (5GS) and the 5G quality of service (QoS) model allow classification and differentiation of specific services such as Public Warning System, Emergency Services, Multimedia Priority Services, Mission Critical Services, internet protocol (IP) multimedia subsystem (IMS) support, etc., based on subscription-related and invocation-related priority mechanisms. These mechanisms provide abilities such as invoking, modifying, maintaining and releasing QoS flows with priority, and delivering QoS flow packets according to the QoS characteristics under network congestion conditions.

These mechanisms were built to assure traffic QoS for the high priority subscribers/services based on "existing" resources allocated to the attached network, sub-network or network slicing. The "existing" resources include compute, memory, storage and networking resources. However, the QoS of a subscriber's service could not be fulfilled if the resource of the attached network, sub-network or network slicing was not guaranteed.

Thus, in order to assure traffic QoS in running time, one embodiment described herein provides a prioritizing mechanism to guarantee the resources required by the network, sub-network or network slicing serving high priority services during their deployment and scaling period, especially given a lack of resources. According to some embodiments, to implement the new priority mechanism for resource allocation or reallocation, a "Priority" attribute may be introduced in Managed Objects (MO) of 3GPP and European Telecommunications Standards Institute (ETSI) management and network orchestration (MANO) network resource model (NRM), and may be exchanged between a 3GPP Management System and ETSI network function virtualization (NFV) MANO on a Nssmf-ma-nfvo Reference Point (RF). It is noted that the term network resource model (NRM) relates to 3GPP, while ETSI NFV may use the terms "information model" and "data model," which are similar concepts to NRM. Some embodiments described herein may generically refer to 3GPP and ETSI NFV information and data models.

As mentioned above, 5GS supports various services, such as Public Warning System, Emergency Services, Multimedia. Priority Services, Mission Critical Services, IMS support, etc., with shared resources, that increased flexibility and scalability of the networks and decreased Capex/Opex of operators. However, high demanding resource services, such as an IMS supported service, can exhaust system resources without effective resource isolation and prioritization.

Network Slicing was introduced in 5GS to create logical networks/partitions, with appropriate isolation, resources and optimized topology to serve a particular purpose or service category. A deployed Network Slice (NS) is formed with a set of Network Function (NF) instances and the required resources (e.g., compute, storage and networking resources). In addition, Network Slice Subnet, Managed Functions, and Managed Elements were introduced in 3GPP SA5 to further segment the network resources and facilitate network and resource management.

However, resource contesting between network slices (Slice), network slice sub-networks (NSS) and network functions (NF) is still existing and has not been effectively addressed with current solutions. Accordingly, example embodiments solve at least this problem by, for example, introducing a "priority" attribute for multi-layer managed objects (MOs) in 3GPP and ETSI NFV information and data models, including Network Slice, Network Slice Subnet, Network Service, Network Function, Transport Link. In addition, example embodiments are able to derive priority attributes based on service level requirements (with algorithms regarding how to compute composite priority or how to propagate top down), to communicate the priority of the MOs across multiple domains, which include 3GPP domain, NFV domain, IETF transport domain, etc., and to assign/pre-empt resources for a high priority MO Instance.

Thus, certain embodiments provide mechanisms to ensure that sufficient resources are prioritized for and/or allocated to a network/subnetwork to satisfy a service level agreement (SLA)/QoS of high priority services. More specifically, some embodiments can provide a solution across multiple layer MOs between 3GPP management system and ETSI MANO in order to effectively guarantee enough resources for critical or high priority services.

As introduced above, according to an embodiment, a "priority" can be provided for multi-layers managed objects in 5GS. Some embodiments may also define on which type of managed object the "priority" should be applied, and how to calculate and/or derive the "priority" of the managed object in each level based on SLA/QoS, priority of the customer/network services, priority of parent objects, number of associated objects, etc. Certain embodiments may also provide mechanisms for how to exchange the "priority" from one management system to another, as well as how the management systems should allocate and/or reallocate the resources based on the priority.

With certain embodiments, the management system, such as a network management system, can assign a correct priority to managed objects and influence the resource management system to reserve and/or allocate enough resources to the managed object instances which constitute the network/subnetwork. As a result, example embodiments can guarantee the SLA requirement of emergency, critical and/or high priority services (e.g., natural disaster situations) even in a resource shortage situation.

Figure 1:
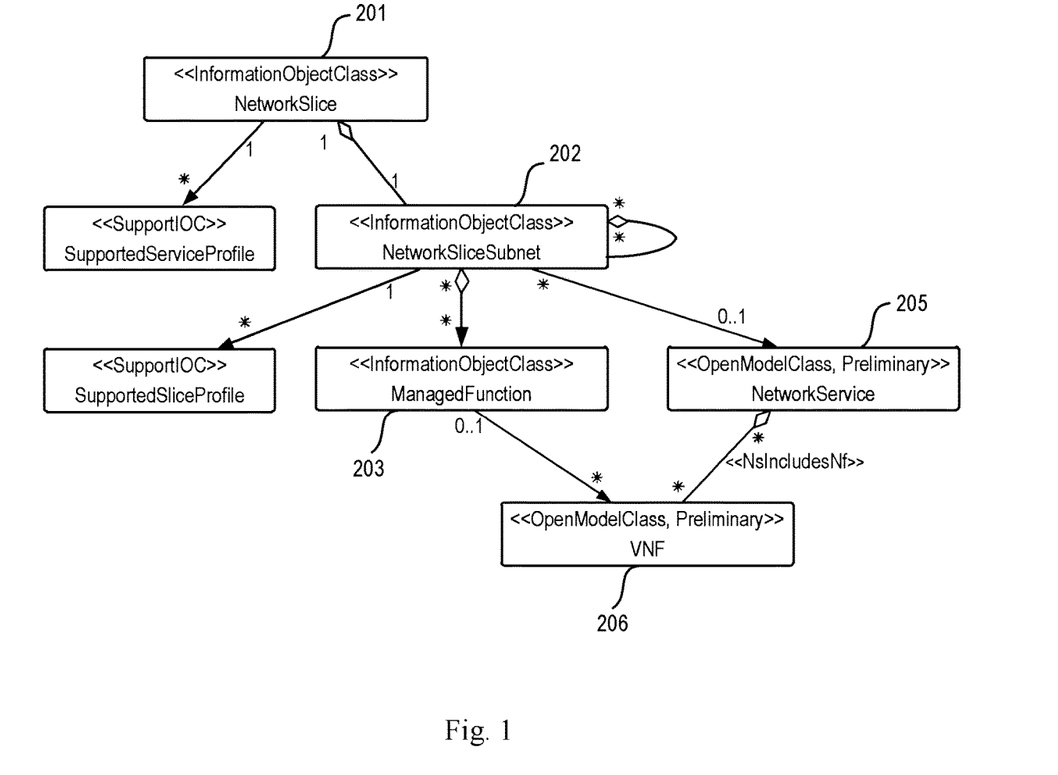
FIG. 1 illustrates an example diagram depicting a network slice NRM containment/naming relationship, according to certain embodiments.

FIG. 1 illustrates an example diagram of a network slice NRM containment/naming relationship in an object structure, according to an example embodiment. By way of example, the object structure is organized as a tree structure. More specifically, the example of FIG. 1 illustrates the new priority attributes captured in 3GPP NRM and ETSI NFV in certain embodiments. According to example embodiments, a "Priority" attribute is introduced in Information Object Classes (IOCs) of 3GPP NRM and ETSI NFV information model classes.

Figure 2:
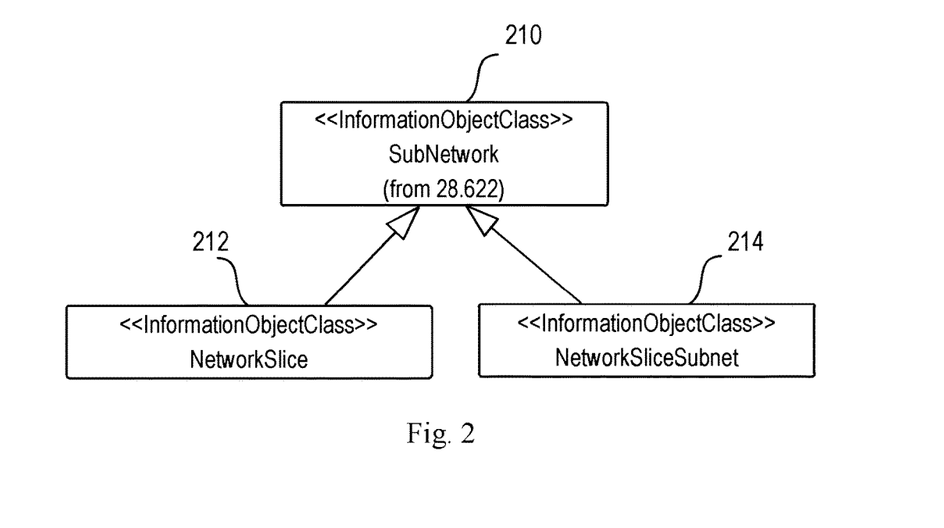
FIG. 2 illustrates an example diagram of a network slice inheritance relationship, according to an example embodiment.

As illustrated in the example of FIG. 1, the applicable IOCs may include, in 3GPP NRM, Network Slice (Slice) 201, Network Slice Subnet (NSS) 202, Managed Function (MF) 203, Managed Element, and SubNetwork. In the ETSI NFV Descriptor, the applicable MOs may include Network Service (NS) 205 and Virtualized Network Function (VNF) 206. FIG. 2 illustrates an example diagram depicting a network slice inheritance relationship, according to an embodiment. As illustrated in the example of FIG. 2, a network slice IOC 212 and network slice subnet IOC 214 may inherit from a subnetwork IOC 210.

According to certain embodiments, a new data type for the priority attribute is provided for each of the Managed Objects (MOs). In one example, the priority attribute may include a priority constraint and/or value. In some embodiments, the Slice Priority (for Network Slice) is a priority attribute at the slice IOC, NSS Priority (for Network Slice Subnet) is a priority attribute at the network slice subnetwork IOC, NS Priority (for Network Service if support Network Function Virtualization) is a priority attribute at the NS IOC, NF Priority (for Network Function) is a priority attribute at the NF IOC, and/or TN Priority (for Transport Network) is a priority attribute at the TN IOC. According to certain embodiments, the priority value may include a defined data type, range, and/or semantics for the priority value to allow for programmable interpretation, calculation and extension. For example, the priority value may be defined as a float with 2 decimal fractions, range, such as −99.99 to 99.99, where the higher value has higher priority.

Furthermore, example embodiments provide a process or algorithm for calculating and/or deriving a priority value for each managed object. According to an embodiment, for a Root Managed Object (e.g., Network Slice MO), the process/algorithm may take, as an input, the type of the priority, SLA of its serving communication services, communication service type (e.g., communication service type such as that defined in 5.16 of 3GPP 23.501), network service type (e.g., eMBB, uRLLC, mIoT, etc.), and/or customer type (e.g., Public Safety, Government, Operator, Energy, Utility, etc.). The process/algorithm may then output the value of the priority based on one or more of those inputs. It is noted that, in some embodiments, the priority can be automatically calculated or designated/adjusted by the administrator.

According to a further embodiment, for a Child Managed Object (e.g., NSS, MF, NS, etc.), the process/algorithm may take as an input, the priority type, priority of parents, weight of priority (e.g., 1%-100%, which may be linearly dependent coefficient of priority. For example, if higher value represents higher priority, then the higher priority has higher weight. If higher priority has lower value, the higher priority has lower weight also), and/or number of parent priority. In an embodiment, a child MO's priority constraint may be calculated according to the following formula: MO's Priority=((Priority of Parent 1*Priority Weight of Parent 1 . . . Priority of Parent n*Priority Weight of Parent n/n (Number of parents))*Priority Type Coefficient. As a result, the process/algorithm can output the value of the received priority constraint, or a priority value satisfying the constraint, for the child MO. In an embodiment, the actual priority assigned to the child MO may be different, but satisfy the computed constraint.

As one example, a network slice subnet priority constraint may be calculated, for example, according to the following: NSS Priority=((Slice 1 Priority*weight of Slice 1 Priority+Slice 2 Priority*weight of Slice 2 Priority . . . /2)*1 (Priority Type Coefficient of NSS is 1). As another example, a network slice priority constraint can be calculated according to the following: NS Priority=((NSS 1 Priority 1*weight of NSS 1 Priority+NSS 2 Priority*weight of NSS 2 Priority/2*2 (Priority Type Coefficient of NS is 2).

Figure 3:
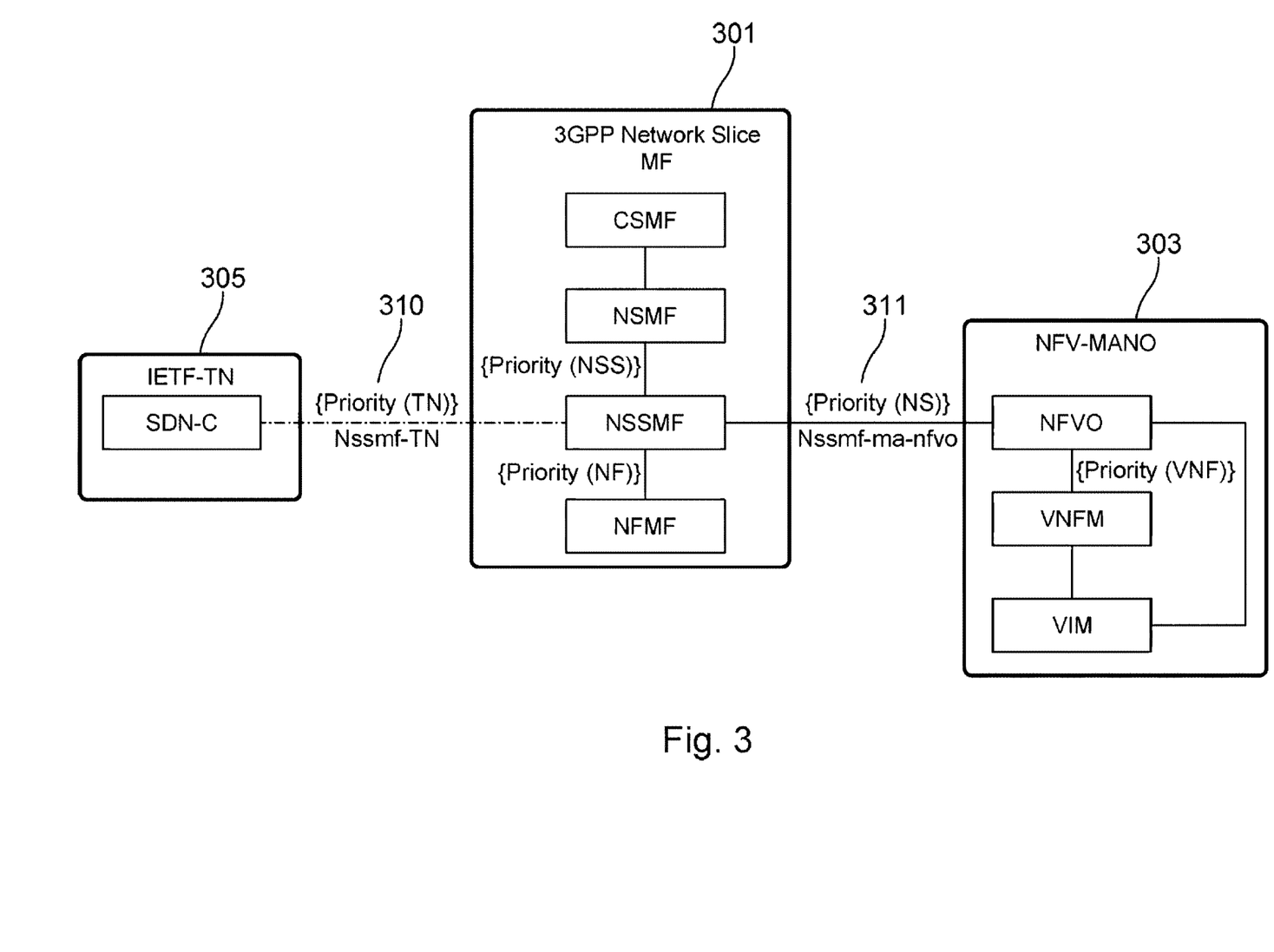
FIG. 3 illustrates an example block diagram of a system depicting the exchange of priority between management systems, according to an embodiment.

Certain embodiments may also provide a mechanism to communicate and/or exchange priority between different management systems. In an embodiment, the interface between the management systems may be updated to include priority related parameters. FIG. 3 illustrates an example block diagram of a system depicting the exchange of priority between management systems, according to an embodiment. As illustrated in the example of FIG. 3, NS priority 311 may be communicated/exchanged between 3GPP Management System 301 and MANO 303 (for virtualized VNF included in Slice/NSS). Transport network (TN) priority 310 may be communicated/exchanged between 3GPP Network Management System 301 and TN Management System 305. Thus, according to an embodiment, a priority attribute may also be provided in the TN 305.

Further, certain embodiments provide a mechanism to manage network resources based on the priority of Managed Objects, including at least one or more of the following management processes: allocate resource based on priority, monitor resource usage based on priority, modify/reallocate resource based on priority, and/or monitor priority of the MOI.

Figure 4:
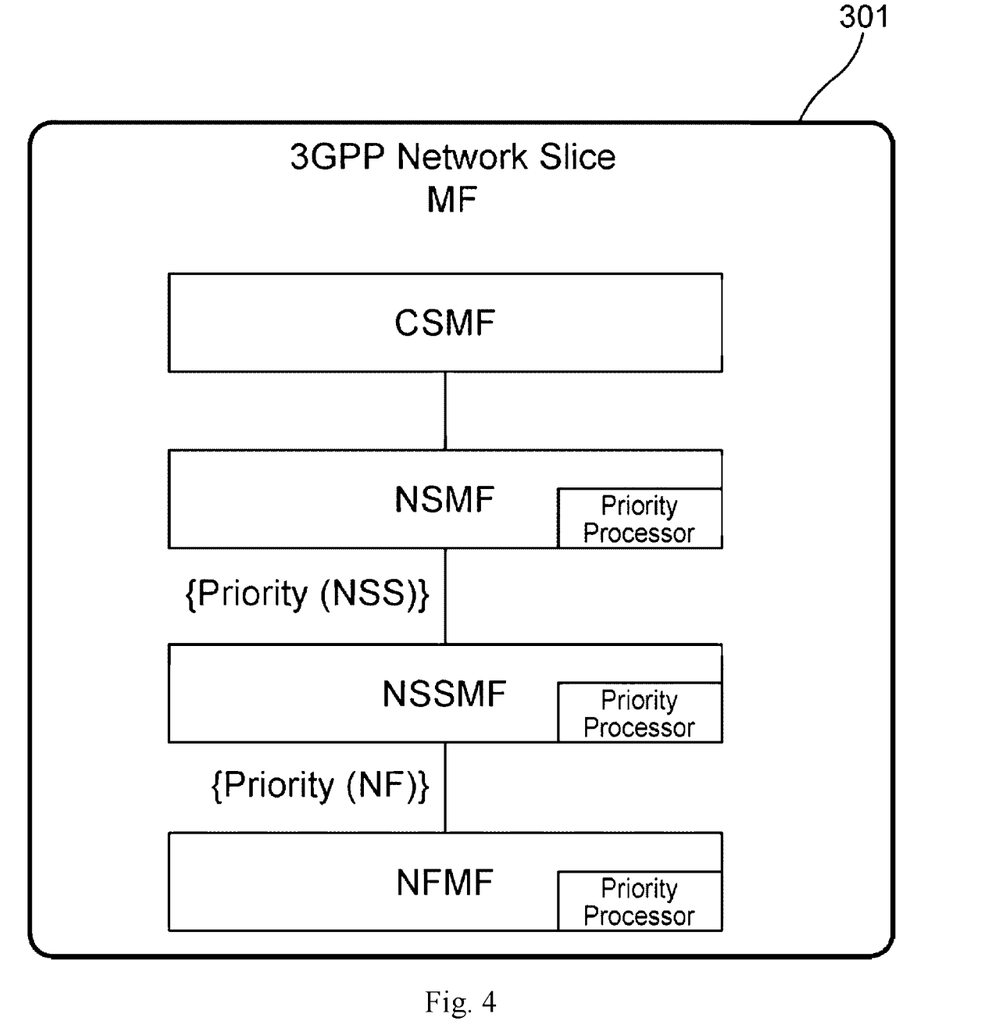
FIG. 4 illustrates an example of functional blocks of a 3GPP management system that are configured to implement the priority-based resource allocation, monitoring, and re-allocation logic, according to certain embodiments.

FIG. 4 illustrates an example of the functional blocks of a 3GPP management system 301 that are configured to implement the priority-based resource allocation, monitoring, and re-allocation logic, according to certain embodiments. As illustrated in FIG. 4, the priority attribute may be provided in the Network Slice, Network Slice Subnet and Network Function of a 3GPP NS management function.

Figure 5:
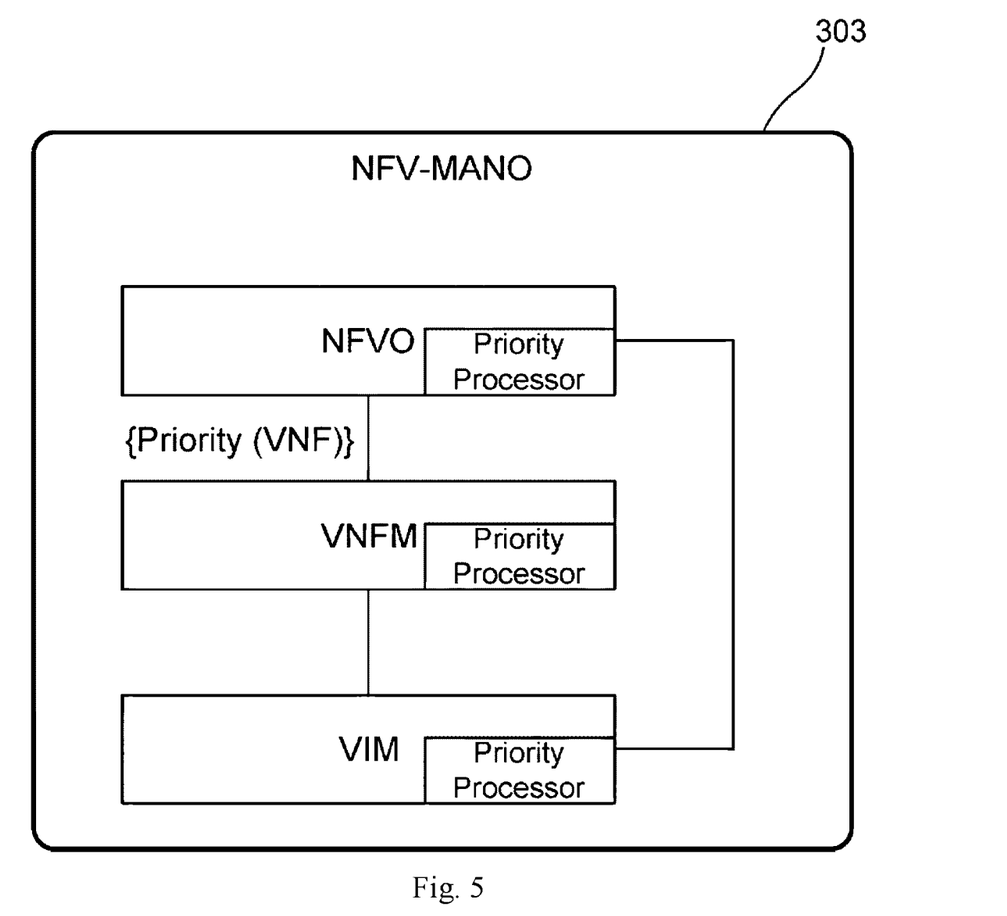
FIG. 5 illustrates an example of the MANO functional blocks of a NFV MANO that are configured to implement the priority-based resource allocation, monitoring, and re-allocation logic, according to certain embodiments.

FIG. 5 illustrates an example of the MANO functional blocks of a NFV MANO 303 that are configured to implement the priority-based resource allocation, monitoring, and re-allocation logic, according to certain embodiments. As illustrated in FIG. 5, the priority attribute may be provided in the Network Slice and VNF (NFV NSD and VNFD).

An example initial deployment of an end-to-end (E2E) network services use case is described in the following to explain the technical implementations of certain embodiments. It is noted that this example represents one example embodiment from among many possible embodiments, and does not represent all of the features of certain embodiments. For instance, concrete service/slice types and names (eMBB, uLLRC), subnet names (RAN, TN, Core), numbers (1 RAN NSS, 1 TN NSS, etc) and Priority values (1.0, 0.82, 0.8, etc.), are just some examples.

In this example, it may be assumed that an operator has built core and edge clouds, as well as a transport network to provide 5G network service to their enterprise customers. The operator may have already deployed and activated several eMBB and uLLRC network services in their network, and may have been asked by a government entity to deploy an uLLRC network service to support their emergency communication service in an Airport. The operator plans to deploy an uLLRC network slice for the network service from Network Management System (NMS). The operator inputs the service type (uLLRC), customer type (Government) and region (Airport) and SLA into the NMS. NMS calculates the slice priority based on the aforementioned parameters and shows the result to the operator, e.g., the priority of the slice may be 1.00 in this example. Operator could adjust the priority based on their predefined polices. The operator then selects slice template to deploy, in which 3 NSSs (1 RAN NSS, 1 TN NSS and 1 Core NSS) are included. To simplify, in this example, the scenario that the new Network Slice Instance (NSI) and Network Slice Subnet Instances (NSSIs) will be created is considered.

According to this example, the deployment steps may include the following. Network Slice Management Service Provider (NSMS_Provider) receives an AllocateNsiRequest from NS MS Consumer (NSMS_Consumer) with network slice related requirements including Slice Priority. Based on the network slice related requirements, the NSMS_Provider creates a new NSI, the NSMS_Provider derives the network slice subnets related requirements including Slice Priority from the received network slice related requirements. The Priority of the NSSs may be calculated based on number and priorities of associated Network Slices. In this case, the number of slices is 1, and the Slice Priority is 1.00, so the NSS priority of the 3 NSSs (RAN NSS, Core NSS and TN NSS) are all 1.00. Network Slice Subnet Management Service Provider (NSSMS_P) receives an AllocateNssiRequest from Network Slice Subnet Management Service Consumer (NSSMS_C) with network slice subnet related requirements including NSS priority for RAN NSS. NSSMS_P creates the MOI for the NSSI to be created. NSSMS_P derives the corresponding network slice subnet constituent (i.e. NF, constituent NSS) related requirements from the received network slice subnet related requirements including NSS priority. The priority of the constituted NFs may be calculated based on number and priorities of associated NSSs. In this case the number of NSS is 1, and the NSS Priority is 1.00, so the NF priority of RAN NFs is 1.00.

Network Function Management Service Provider (NFMS_P) receives a ModifyNfRequest from Network Function Management Service Consumer (NFMS_C) with Identifier of MOI for NF instance and network function related requirements (i.e., Configuration information) including NF priority. NFMS_P reconfigures corresponding MOI for the NF instance and sends the ModifyNfResponse to NFMS_C. Network Slice Subnet Management Service Provider (NSSMS_P) receives an AllocateNssiRequest from Network Slice Subnet Management Service Consumer (NSSMS_C) with network slice subnet related requirements including NSS priority for Core NSS. As the NSSI to be created contains virtualisation part (i.e. VNF or VL), NSSMS_P derives the NS instance instantiation information which including NS priority and invokes the NS instantiation procedures to create a NS instance. The priority of the NS instance may be calculated based on number and priorities of associated NSSs. In this case the number of NSS is 1, and the NSS Priority is 1.00, so the NS priority is 1.00. In case the NS instance is associated to two NSSs, and the another NSS Priority is 0.8, the NS priority could be 0.82.

Network Orchestrator (NO) receives NS instantiation call with related requirements including NS priority, NO reserves the resources for the Network Service Instance based on related requirements including NS priority and derives priorities for constituent VNFs/VLs from NS priority. In another embodiment, 3GPP management system may generate a network service descriptor (NSD) with the priority constraint values built-in, on-board it to NFVO, and then request NS instantiation according to the on-boarded NSD.

The priority of the VNF instance may be calculated based on number and priorities of associated NSs. In this case the number of NS is 1, and the NS Priority is 1.00, so the VNF priority is 1.00. NO invokes the VNF instantiation procedures to create a VNF instance. The VNF Manager (VNFM) receives VNF instantiation call with related requirements including VNF Priority, VNFM allocates resources for the VNF based on related requirements including VNF priority and creates VNF instance. If there's no enough resource to deploy the VNF instance, VNFM would check the VNF priority of another deployed VNF instances. If the priority of deployed VNF instances is less than 1.00, VNFM could terminate or scale in this lower priority VNF and allocate the resource to the higher priority VNF. VNFM Responds to NO after created VNF Instance. Network Orchestrator Responds to NSSMS_P after created Network Service Instance. Network Slice Subnet Management Service Provider (NSSMS_P) receives an AllocateNssiRequest from Network Slice Subnet Management Service Consumer (NSSMS_C) with network slice subnet related requirements including NSS priority for TN NSS. NSSMS_P derives TN priority from the NSS priority, and invokes corresponding procedure of coordination with relevant TN Manager to handle the TN part. The NSMS_Provider creates the MOI for NSI and configures the MOI with the DN of MOI for the NSSI, another configuration information (e.g. nSSAI) may be configured for the created MOI.

The NSMS_Provider sends NSI allocation result to the NSMS_Consumer. If an existing NSI is modified or a new NSI is created successfully to satisfy the network slice related requirements, the result includes the relevant network slice instance information. Again, it is noted that the above deployment example, is just one example of an implementation of some embodiments and numerous other examples are also possible.

Figure 6:
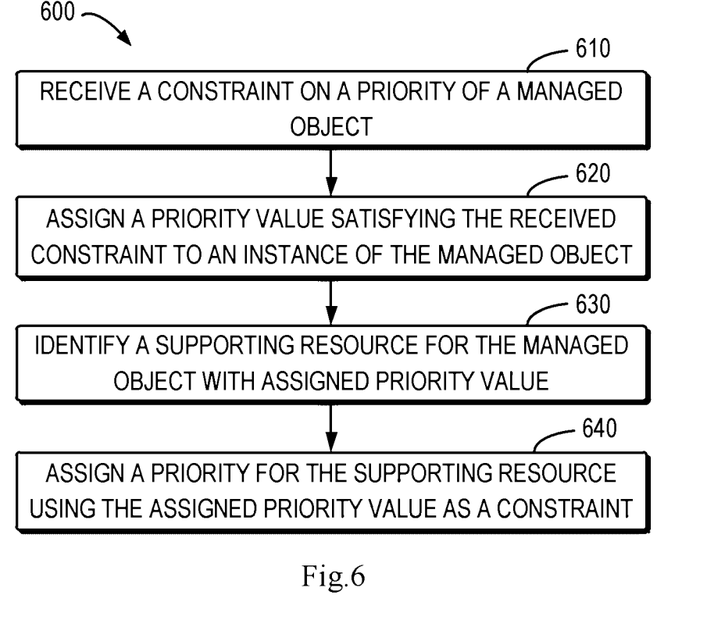
FIG. 6 illustrates an example flow diagram of a method, according to one embodiment.

FIG. 6 illustrates an example flow diagram of a method 600 for handling managed object priorities, according to an example embodiment. In certain example embodiments, the flow diagram of FIG. 6 may be performed by a network entity or network node in a 3GPP communication system, such as 5G or NR, or by a management function thereof. For instance, in some example embodiments, the method of FIG. 6 may be performed by a base station, eNB, gNB, or an access node or the like in a 5G system, or by a management function thereof.

In one embodiment, the method 600 of FIG. 6 may include, at 610, receiving a constraint on a priority of a managed object. In certain embodiments, the managed object may include one or more of a 3GPP managed function, a 3GPP managed element, an ETSI NFV NS, an ETSI NFV VNF, an ETSI NFV VNFC, and/or an ETSI NFV VR.

As illustrated in the example of FIG. 6, the method may also include, at 620, assigning a priority value satisfying the received constraint to an instance of the managed object. In some embodiments, the method may include deriving or calculating the priority value as discussed in detail above. The method may further include, at 630, identifying a supporting resource for the managed object with the assigned priority value. The method may further include, at 640, assigning a priority for the supporting resource, using the assigned priority value as a constraint.

In certain embodiments, the method 600 may be performed for each managed object in an object structure including the managed object. Thus, in certain embodiments, the steps of assigning, identifying, and assigning at blocks 620 to 640 can be recursively performed for each managed object. In certain embodiments, constraints on priorities of all the managed objects may be received together or in separate steps. The process performed for each managed object may be performed in parallel or in a specific order. For example, the steps of assigning the priority value at block 620 may be first performed for each managed object and the identifying and the assigning of the priority for the supporting resource at blocks 630 and 640 may then be performed.

According to certain embodiments, multiple containment relationships may be taken into account when assigning the priority value to each managed object (e.g., assigning derived priority satisfying multiple constraints). In an embodiment, a supporting resource may support multiple managed objects. In another embodiment, the method may include monitor the supporting value using the priority value of the managed object as a constraint. In an embodiment, the method may include concluding that a supporting resource cannot support multiple objects due to corresponding priority conflicts.

According to certain embodiments, the method 600 may further include identifying dependent managed objects of the managed object based on an object containment relationship in an object structure including the managed object and assigning priority values to instances of the identified dependent managed objects using the assigned priority value as a constraint. That is to say, the priory value of a managed object can be used as a constraint for assigning the priority values of its dependent managed objects. Herein, dependent managed object of a given managed object includes parent and/or child managed objects of the given managed object.

In one embodiment, the method 600 may include determining whether priority values have been assigned to each identified managed object and, if not, repeat the assigning of the priority value to the object instance and the assigning of the priority value to each identified managed object, until each identified managed object has an assigned priority value. When one or more identified managed objects have a corresponding assigned priority value(s), the method 600 may include identifying the supporting resource for each identified managed object with the priority value assigned. In an embodiment, the method 600 may also include assigning a priority for each supporting resource, using the priority value of the managed object as a constraint.

According to certain embodiments, the step of assigning the priority value may include calculating the priority value for the managed object.

According to certain embodiments, the step of assigning the priority value may include: receiving the priority for the managed object from a management function which manages the managed object.

According to certain embodiments, the method 600 may further include monitoring the supporting resource using the priority value of the managed object as a constraint.

According to certain embodiments, the managed object may include at least one of: a 3GPP Managed Function; a 3GPP Managed Element; a 3GPP Sub Network; a 3GPP Network Slice; a 3GPP Network Slice Subnet; an ETSI NFV NS; an ETSI NFV VNF; an ETSI NFV VNFC; or an ETSI NFV VR.

According to certain embodiments, when the managed object may include a root managed object, the step of assigning the priority value may include: deriving the priority value based on at least one of a service level agreement, communication service type, and customer type.

According to certain embodiments, when the managed object may include a child managed object, the step of assigning the priority value may include: deriving the priority value based on at least one of a priority of one or more parent managed objects, a priority of one or more child managed object, a weight of the priority of the one or more child managed objects, a weight of the priority of the one or more parent managed objects, the number of the one or more child managed objects, and the number of the one or more parent managed objects.

According to certain embodiments, the priority of the managed object is exchanged inside a management function, or between management functions of a same management domain, or between management domains.

According to certain embodiments, the method 600 may further include recursively performing the steps of assigning, identifying and assigning for each managed object.

Figure 7:
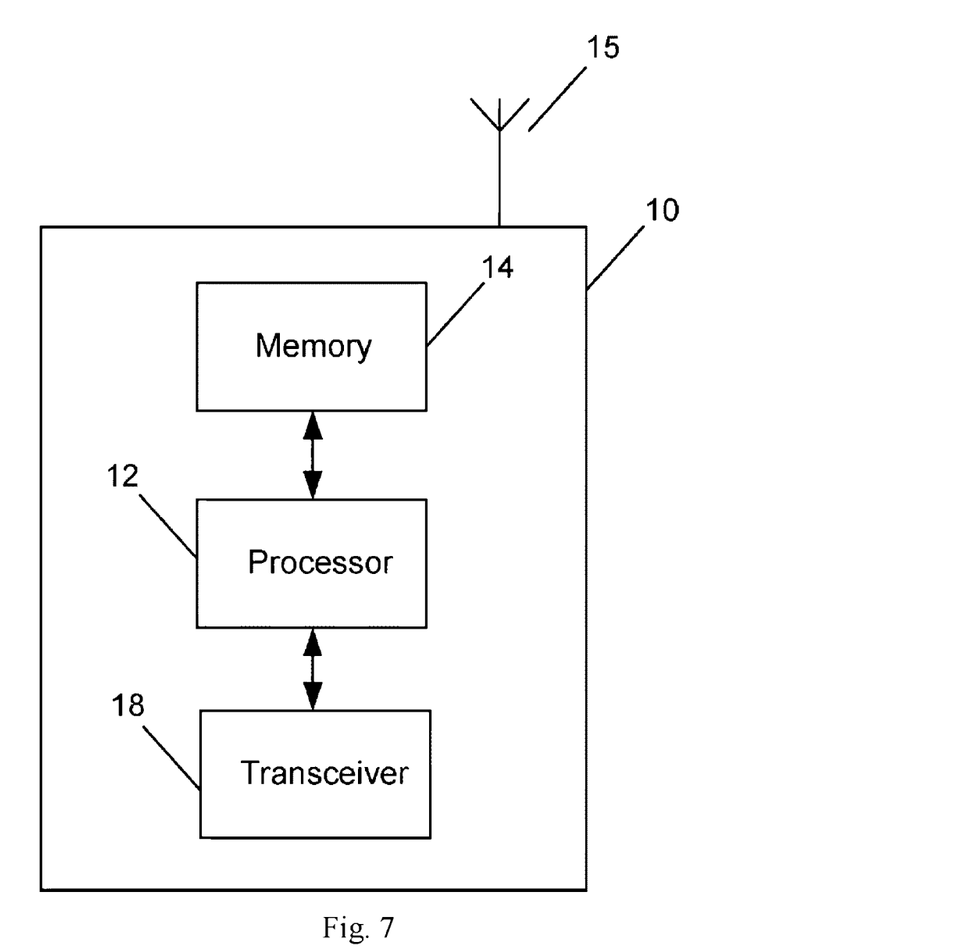
FIG. 7 illustrates an example block diagram of an apparatus, according to an embodiment.

FIG. 7 illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR. According to one embodiment, apparatus 10 may comprise a management function in a 5G system.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. In one embodiment, apparatus 10 may comprise a management function in a 5G system. According to certain embodiments, apparatus 10 may be controlled by memory 14 and processor 12 to perform the functions associated with any of the embodiments described herein, such as the flow or signaling diagrams illustrated in FIG. 6. In some embodiments, apparatus 10 may be configured to perform a procedure for handling managed object priorities.

For instance, in one embodiment, apparatus 10 may be controlled by memory 14 and processor 12 to receive a constraint on a priority of a managed object. In certain embodiments, the managed object may include one or more of a 3GPP managed function, a 3 GPP managed element, a 3 GPP subnetwork, a 3GPP network slice, a 3GPP network slice subnet, an ETSI NFV NS, an ETSI NFV VNF, an ETSI NFV VNFC, and/or an ETSI NFV VR.

According to an embodiment, apparatus 10 may be controlled by memory 14 and processor 12 to assign a priority value satisfying the received constraint to an instance of the managed object. In some embodiments, apparatus 10 may be controlled by memory 14 and processor 12 to assign (derive or calculate) the priority value in accordance with the process/algorithm discussed in detail above. In one embodiment, apparatus 10 may be controlled by memory 14 and processor 12 to identify a supporting resource for the managed object with assigned priority value and assign a priority for the supporting resource using the assigned priority value as a constraint.

In one embodiment, apparatus 10 may be controlled by memory 14 and processor 12 to identify dependent managed objects based on the object containment relationship in an object structure including the managed object. According to an embodiment, apparatus 10 may be controlled by memory 14 and processor 12 to assign priority values to instances of the identified dependent managed objects using the assigned priority value as a constraint.

In an embodiment, apparatus 10 may be controlled by memory 14 and processor 12 to calculate the priority value for the managed object.

In an embodiment, apparatus 10 may be controlled by memory 14 and processor 12 to receive the priority for the managed object from a management function which manages the managed object.

In an embodiment, apparatus 10 may be controlled by memory 14 and processor 12 to monitor the supporting resource using the priority value of the managed object as a constraint.

In an embodiment, apparatus 10 may be controlled by memory 14 and processor 12 to derive the priority value based on at least one of a service level agreement, communication service type, and customer type.

In an embodiment, apparatus 10 may be controlled by memory 14 and processor 12 to derive the priority value based on at least one of a priority of one or more parent managed objects, a priority of one or more child managed objects, a weight of the priority of the one or more child managed objects, a weight of the priority of the one or more parent managed objects, the number of the one or more child managed objects, and the number of the one or more parent managed objects.

In an embodiment, the priority of the managed object is exchanged inside a management function, or between management functions of a same management domain, or between management domains.

In an embodiment, the at least one memory and computer program code are further configured, with the at least one processor, to cause the apparatus to recursively perform the steps of assigning, identifying and assigning for each managed object.

According to certain embodiments, apparatus 10 may be controlled by memory 14 and processor 12 to recursively repeat, for each managed object, the assigning of the priority value to the object instance and the assigning of the priority value to each identified managed object. As such, in one embodiment, apparatus 10 may be controlled by memory 14 and processor 12 to determine whether priority values have been assigned to each identified managed object and, if not, repeat the assigning of the priority value to the object instance and the assigning of the priority value to each identified managed object, until each identified managed object has an assigned priority value. When one or more identified managed objects have a corresponding assigned priority value(s), apparatus 10 may be controlled by memory 14 and processor 12 to identify the supporting resource for each identified managed object with the priority value assigned. In an embodiment, apparatus 10 may be controlled by memory 14 and processor 12 to assign a priority for each supporting resource, using the priority value of the managed object as a constraint.

According to certain embodiments, multiple containment relationships may be taken into account when apparatus 10 assigns the priority values to each managed object (e.g., assign derived priority satisfying multiple constraints). In an embodiment, a supporting resource may support multiple managed objects. In another embodiment, apparatus 10 may be controlled by memory 14 and processor 12 to monitor the supporting value using the priority value of the managed object as a constraint and may determine that a supporting resource cannot support multiple objects due to the corresponding priority conflicts.

In certain embodiments, there is also provided an apparatus that may include receiving means for receiving a constraint on a priority of a managed object; assigning means for assigning a priority value satisfying the received constraint to an instance of the managed object; identifying means for identifying a supporting resource for the managed object with the assigned priority value; and assigning means for assigning a priority for the supporting resource, using the assigned priority value as a constraint.

Therefore, certain example embodiments provide several technical improvements, enhancements, and/or advantages. For example, certain embodiments provide improvements to the handling of managed object priorities in 5G systems. As discussed above, a 3GPP management system may "slice priority" and example embodiments provide methods for allowing a management system to derive the "slice priority", to exchange it between the management systems (e.g. 3GPP and MANO), and to utilize the value of the "slice priority" in resource management by the MANO system. Thus, according to certain embodiments, a "priority" attribute is introduced at the 3GPP NRM IOC level (becomes applicable to all managed objects). In addition, some embodiments can specify how a "priority" attribute value is derived for composite objects by following the 3GPP NRM containment relationships. In one embodiment, a top-down approach (e.g., from high level service priority, down to slice instances supporting this service, down to slice subnetworks supporting these slice instances, down to individual managed functions) is contemplated, as well as bottom-up approach (e.g., high priority function such as HSS/HLR constraining the minimum priority of subnets, slices and services it participates in). Further, certain embodiments may specify how a 3GPP "priority" attribute applies to the MANO objects (i.e., each "virtualized" 3GPP managed object has a reference to the VNF instance implementing it). This allows for deriving MANO object (VNF, VNFC, VR) priorities based on the priorities of the supported 3GPP objects. Additionally, an embodiment may specify (e.g., in MANO specifications) how priority received by the MANO from 3GPP is used for resource allocations.

As such, example embodiments may improve power efficiency, performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the invention, therefore, reference should be made to the appended claims.

What is claimed is:

1. An apparatus, comprising:
   at least one processor; and
   at least one memory comprising computer program code,
   the at least one memory and computer program code configured, with the at least one processor, to cause the apparatus at least to
   receive a constraint on a priority of a managed object;
   assign a priority value satisfying the received constraint to an instance of the managed object;
   identify a supporting resource for the managed object with assigned priority value; and
   assign a priority for the supporting resource using the assigned priority value as a constraint.

2. The apparatus of claim 1, wherein the at least one memory and computer program code are configured, with the at least one processor, to cause the apparatus at least to:
   identify dependent managed objects of the managed object based on an object containment relationship in an object structure including the managed object;
   assign priority values to instances of the identified dependent managed objects using the assigned priority value as a constraint.

3. The apparatus according to claim 1, wherein the at least one memory and computer program code are configured, with the at least one processor, to cause the apparatus at least to
   calculate the priority value for the managed object.

4. The apparatus according to claim 1, wherein the at least one memory and computer program code are configured, with the at least one processor, to cause the apparatus at least to
   receive the priority for the managed object from a management function which manages the managed object.

5. The apparatus according to claim 1, wherein the at least one memory and computer program code are further configured, with the at least one processor, to cause the apparatus at least to
   monitor the supporting resource using the priority value of the managed object as a constraint.

6. The apparatus according to claim 1, wherein the managed object comprises at least one of:
   a 3 GPP Managed Function;
   a 3 GPP Managed Element;
   a 3 GPP Sub Network;
   a 3 GPP Network Slice;
   a 3 GPP Network Slice Subnet;
   an ETSI NFV NS;
   an ETSI NFV VNF;
   an ETSI NFV VNFC; or
   an ETSI NFV VR.

7. The apparatus according to claim 1, wherein, when the managed object comprises a root managed object, the at least one memory and computer program code are further configured, with the at least one processor, to cause the apparatus at least to:
   derive the priority value based on at least one of a service level agreement, communication service type, and customer type.

8. The apparatus according to claim 1, wherein, when the managed object comprises a child managed object, the at least one memory and computer program code are further configured, with the at least one processor, to cause the apparatus at least to:
   derive the priority value based on at least one of a priority of one or more parent managed objects, a priority of one or more child managed objects, a weight of the priority of the one or more child managed objects, a weight of the priority of the one or more parent managed objects, the number of the one or more child managed objects, and the number of the one or more parent managed objects.

9. The apparatus according to claim 1, wherein the priority of the managed object is exchanged inside a management function, or between management functions of a same management domain, or between management domains.

10. The apparatus according to claim 1, wherein the at least one memory and computer program code are further configured, with the at least one processor, to cause the apparatus to recursively perform the steps of assigning, identifying and assigning for each managed object.

11. A method, comprising:
    receiving a constraint on a priority of a managed object;
    assigning a priority value satisfying the received constraint to an instance of the managed object;
    identifying a supporting resource for the managed object with the assigned priority value; and
    assigning a priority for the supporting resource, using the assigned priority value as a constraint.

12. The method according to claim 11, further comprising:
    identifying dependent managed objects of the managed object based on an object containment relationship in an object structure including the managed object; and
    assigning priority values to instances of the identified dependent managed objects using the assigned priority value as a constraint.

13. The method according to claim 11, wherein assigning the priority value comprises:
    calculating the priority value for the managed object.

14. The method according to claim 11, wherein assigning the priority value comprises:
    receiving the priority for the managed object from a management function which manages the managed object.

15. The method according to claim 11, further comprising:
    monitoring the supporting resource using the priority value of the managed object as a constraint.

16. The method according to claim 11, wherein the managed object comprises at least one of:
    a 3GPP Managed Function;
    a 3GPP Managed Element;
    a 3GPP Sub Network;
    a 3GPP Network Slice;
    a 3GPP Network Slice Subnet;
    an ETSI NFV NS;

an ETSI NFV VNF;
an ETSI NFV VNFC; or
an ETSI NFV VR.

17. The method according to claim 11, wherein, when the managed object comprises a root managed object, assigning the priority value comprises:
deriving the priority value based on at least one of a service level agreement, communication service type, and customer type.

18. The method according to claim 11, wherein, when the managed object comprises a child managed object, assigning the priority value comprises:
deriving the priority value based on at least one of a priority of one or more parent managed objects, a priority of one or more child managed objects, a weight of the priority of the one or more child managed objects, a weight of the priority of the one or more parent managed objects, the number of the one or more child managed objects, and the number of the one or more parent managed objects.

19. The method according to claim 11, wherein the priority of the managed object is exchanged inside a management function, or between management functions of a same management domain, or between management domains.

20. A computer program embodied on a non-transitory computer readable medium, said computer program comprising program instructions stored thereon which, when executed on an apparatus, cause the apparatus to perform the method according to claim 11.

* * * * *